United States Patent [19]
Frister et al.

[11] 4,450,389
[45] May 22, 1984

[54] VEHICULAR-TYPE GENERATOR AND FORCED AIR COOLING BLOWER COMBINATION

[75] Inventors: Manfred Frister, Schwieberdingen; Bernhard Fakler, Esslingen, both of Fed. Rep. of Germany

[73] Assignee: Robert Bosch GmbH, Stuttgart, Fed. Rep. of Germany

[21] Appl. No.: 405,534

[22] Filed: Aug. 5, 1982

[30] Foreign Application Priority Data

Aug. 27, 1981 [DE] Fed. Rep. of Germany ....... 3133880
Nov. 12, 1981 [DE] Fed. Rep. of Germany ....... 3144957

[51] Int. Cl.³ .............................................. H02P 7/66
[52] U.S. Cl. .................... 318/140; 318/471; 318/472; 318/473; 318/334; 322/29
[58] Field of Search ............... 318/471, 472, 473, 334, 318/140; 322/8, 29, 30, 89, 90, 100, 27, 46, 6, 3, 17, 33; 123/41.12

[56] References Cited

U.S. PATENT DOCUMENTS

| | | | |
|---|---|---|---|
| 2,505,597 | 4/1950 | Weiser | 123/41.12 |
| 3,621,822 | 11/1971 | Oster | 123/41.12 |
| 3,853,098 | 12/1974 | Ishikawa et al. | 123/41.12 X |
| 4,062,329 | 12/1977 | Rio | 123/41.12 |
| 4,313,402 | 2/1982 | Lehnhoff et al. | 318/471 X |
| 4,376,426 | 3/1983 | Mazur | 123/41.12 |

FOREIGN PATENT DOCUMENTS

| | | | |
|---|---|---|---|
| 669408 | 8/1963 | Canada | 123/41.12 |
| 2064817 | 6/1981 | United Kingdom | 123/41.12 |
| 41853 | 12/1981 | United Kingdom | 123/41.12 |

*Primary Examiner*—G. Z. Rubinson
*Assistant Examiner*—Shik Luen Ip
*Attorney, Agent, or Firm*—Frishauf, Holtz, Goodman & Woodward

[57] ABSTRACT

To provide for effective cooling of an automotive-type alternator and/or other equipment within an automobile, for example the radiator or other heat exchanger, even under external high-temperature conditions and low engine speed ($n_E$), for example under idling conditions, the alternator phase windings (6, 7, 8) are connected to respective phase windings (16, 17, 18) of a three-phase squirrel-cage motor which is connected to a blower (2), preferably a radial-type fan, directing forced air circulation towards the alternator and/or the vehicle radiator, the alternator then being placed within the airstream of the radiator as well. A temperature and/or speed-responsive switch can be interposed between the alternator and the motor to energize the motor only if the temperature of the alternator and/or the engine, or other component, rises above a predetermined level, or if the alternator speed drops below a predetermined level.

12 Claims, 5 Drawing Figures

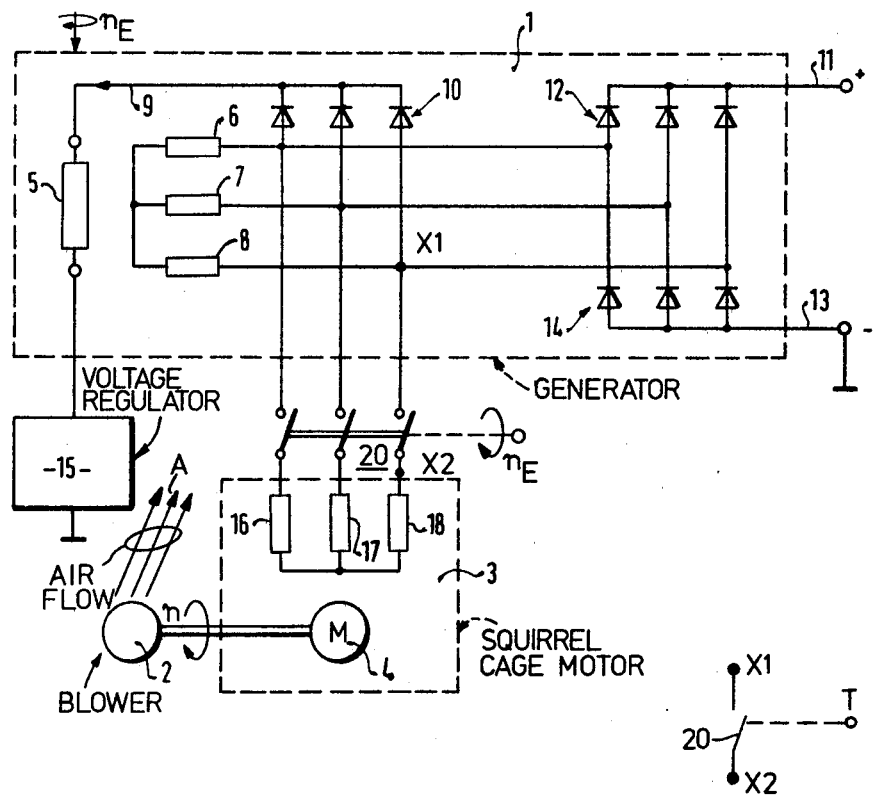
FIG. 1
FIG. 1a
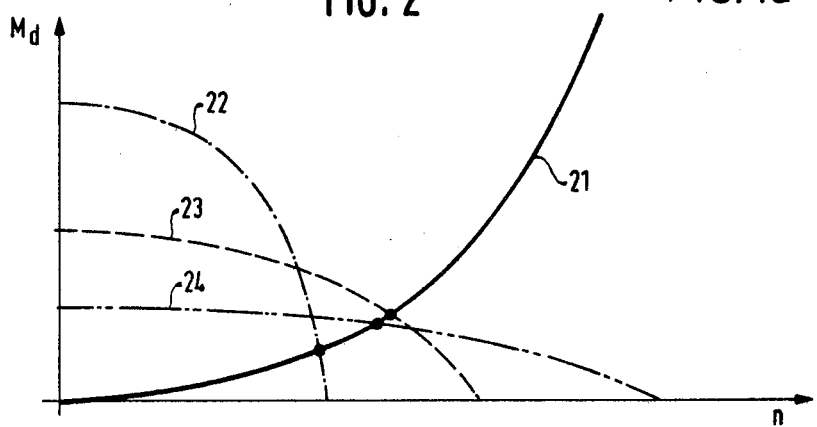
FIG. 2

VEHICULAR-TYPE GENERATOR AND FORCED AIR COOLING BLOWER COMBINATION

The present invention relates to the combination of a mobile-type alternator and a forced air circulation blower, in which the alternator is particularly suitable for supplying, through a rectifier, self-contained direct-current electrical power networks, for example the on-board network of an automotive vehicle; and the air circulation blower can be used to cool the alternator and/or other apparatus, for example an internal combustion engine driving the alternator.

BACKGROUND

Internal combustion (IC) engines, particularly of the vehicular, and especially of the automotive type, must operate over wide ranges of speed. Cooling of the engine, and also of the alternator, causes difficulty at low operating speeds. The alternator, particularly, may be overloaded at low engine speeds when it is additionally highly loaded, for example upon extensive operation under idling speed with power being drawn from the alternator. The lifetime of the alternator is based, in part, on suitable cooling thereof. Additionally, the engine, typically an automotive-type IC engine, requires cooling which may not be adequate under extended periods of idling operation at high ambient temperatures, for example in urban traffic.

THE INVENTION

It is an object to improve cooling of and alternator and/or an IC engine driving the alternator even under low operating speed conditions of the engine, or the alternator, respectively.

Briefly, an induction motor, typically a multi-phase squirrel-cage induction motor, is connected to the alternator phase windings in advance of the rectifier system connected to the alternator to provide rectified direct current to the on-board vehicular network, the motor being mechanically coupled to a blower, preferably of the radial flow type, such as a radial fan or the like, the blower providing forced air circulation and cooling air in a predetermined direction, for example to cool the alternator, and/or the engine driving the alternator, or other accessory equipment. In accordance with a feature of the invention, a switch is interposed between the alternator phase windings and the blower, the switch being controlled by engine speed, and/or engine or alternator tmeperature, to connect the blower for forced air circulation, in accordance with the switch command, for example upon speed of the IC engine below a certain level, or upon predetermined temperature conditions.

Preferably, the alternator is a three-phase alternator, and the motor is a three-phase squirrel-cage motor.

DRAWINGS

FIG. 1 is a schematic illustration of the system in accordance with the present invention;

FIG. 1a is a fragmentary circuit illustration showing modifications;

FIG. 2 is a graph of speed vs. blower motor torque;

Figure 3:
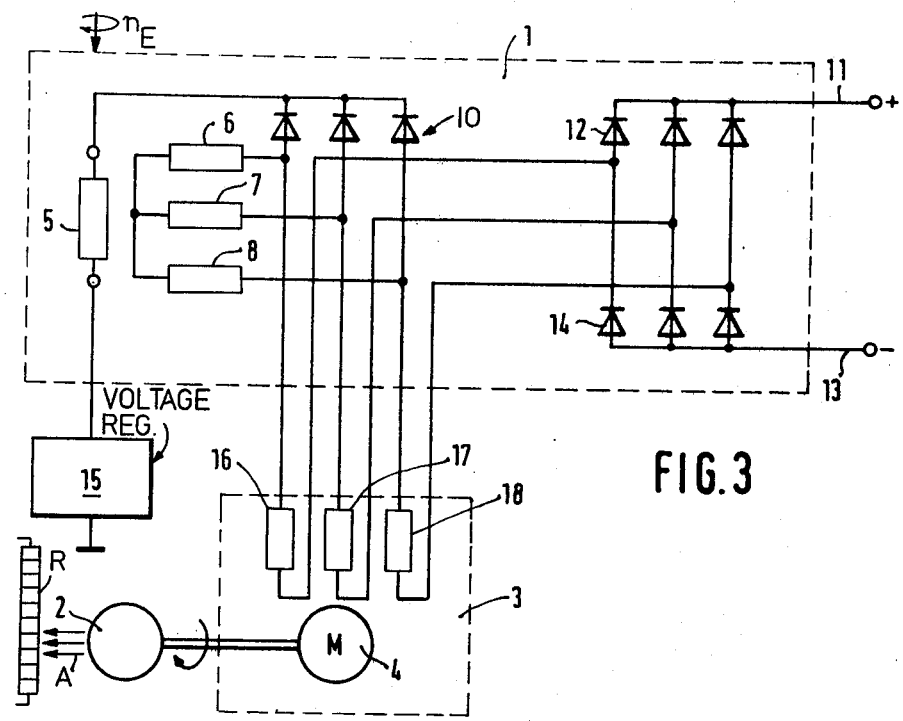
FIG. 3 is a diagram similar to FIG. 1, showing a modification.

An alternator 1 is driven from an internal combustion engine, as schematically illustrated by arrow $n_E$, the speed of the engine varying widely. The alternator has three armature windings 6, 7, 8, excited by a field 5. The structure of the alternator can be in accordance with any well known and standard design. The alternator will have alternating voltages inducted therein upon current flow, schematically indicated by arrow 9 through the field 5. The alternator is a three-phase alternator. Field current 5 is derived from a field or exciter diode group 10, connected to the outputs of the phase windings 6, 7, 8 of the alternator. A voltage regulator 15 controls current flow through the exciter or field winding 5.

The phase windings of the alternator are, further, connected to two groups of power diodes 12, 14 forming, respectively, positive and negative output diodes, the outputs of which are connected to the output terminals or buses 11, 13 to provide direct current supply to an on-board vehicular network, not further shown. The voltage between buses 11, 13 is controlled to a suitable level by the voltage regulator 15, as well known.

The alternator 1 may heat substantially, particularly if heavily loaded and driven at slow speed, for example idling speed of the engine. To cool the alternator, a squirrel-cage motor 3 is connected to the outputs of the phase windings 6, 7, 8 of the alternator, the squirrel-cage motor 3 being directly coupled to a radial blower or fan 2. The squirrel-cage motor has three fixed or stator windings 16, 17, 18 connected to the respective phase windings 6, 7, 8 of the alternator over a switch 20. When the switch 20 is closed, the motor 3 is directly connected to the phase windings 6, 7, 8 of the alternator. In spite of the variable frequency of the voltage derived from the alternator, the operating point for cooling will be relatively stable, as is illustrated by the torque Md of the three-phase motor with respect to speed n. Curve 21 reflects the blower characteristics; curves 22, 23, 24 show various motor operating characteristics with respect to speed n. For stable operation, the motor should be so designed that the torque characteristic does not have an intervening dip.

The switch 20 can be connected manually, or can be permanently connected; in accordance with a feature of the invention, however, the switch 20 is controlled by engine speed, as schematically indicated by the connection to the rotating arrow $n_E$. A centrifugal switch responding, for example, to a predetermined engine speed, e.g. somewhat above idling speed, can be used to open the switch so that, under low engine speed conditions and when cooling is necessary, the switch will be closed.

FIG. 1a shows another modification, for use with a motor in the form of an induction motor, for example of the split-phase type, connected to only one of the alternator phases, at terminals X1, X2, respectively. FIG. 1a shows an additional modification, namely control of the switch 20 as a function of temperature, as schematically indicated by terminal T; swtich 20, then, can be a standard thermostatically controlled switch to energize the motor, which can be single-phase or three-phase as shown in FIG. 1, when the temperature of a motor vehicle component with which the thermostatic switch is associated reaches a predetermined level. The thermostatic swtich, then, can be placed for example on the alternator, on the IC engine, or at any other suitable location where temperature is to be sensed.

Embodiment of FIG. 3: The generator 1 is identical to that previously described; the motor 3, however, is serially connected between the armature windings 6, 7, 8 and the rectifier 12, 14. The phase windings 16, 17, 18 of the motor 3 are serially connected with the armature phase windings 6, 7, 8 of the alternator, so that load current through the alternator will flow through the respective phase windings of the squirrel-cage motor 3 which, then, will operate in dependence on loading of the alternator.

FIG. 3 illustrates another embodiment of the invention, namely that the airflow, schematically indicated by arrows A, is directed to cool the radiator R of the internal combustion engine (not shown) driving the alternator. Thus, the blower 2 can be radiator fan or radiator blower which is usually so located that the airflow therefrom cools not only the radiator but also the radiator (see arrows A, FIG. 1). The switch 20, of course, is no longer needed, although it could be connected to short-circuit the windings 16, 17, 18, for example under high-speed operating conditions or under operating conditions below a predetermined temperature level.

Figure 4:
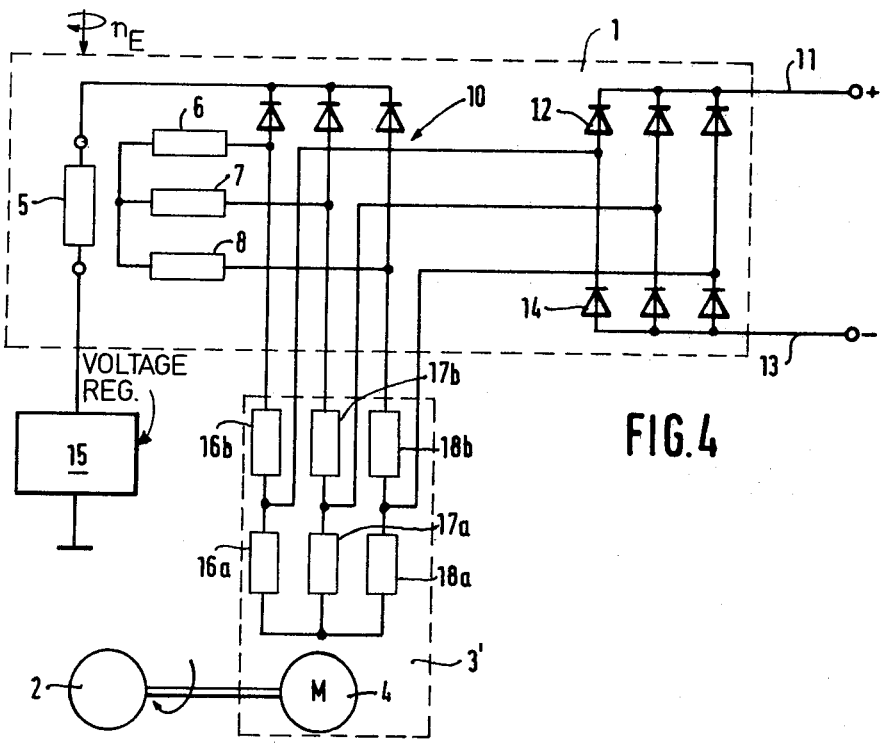
FIG. 4 is a diagram similar to FIG. 1, showing yet another modification.

Embodiment of FIG. 4: The motor 3' is so constructed that its stator windings are subdivided into two winding portions 16a, 16b, 17a, 17b, 18a, 18b, each one of the windings being connected to a respective armature winding 6, 7, 8 of the generator. One of the motor winding portions 16a, 17a, 18a forms a voltage winding, and is connected similar to the connection of the windings 16, 17, 18 of FIG. 1; the other winding portion forms a current winding 16b, 17b, 18b and is serially connected between the respective armature windings 6, 7, 8 of the alternator and the power rectifier 12, 14, that is similar to the connection of FIG. 3. The winding portions are preferably placed in different pole slots of the motor in order to prevent transformer coupling between the voltage and current winding portions of the motor.

Various changes and modifications may be made, and features described in connection with any one of the embodiments may be used with any of the others, within the scope of the inventive concept.

We claim:

1. Vehicular generator-forced air circulation blower combination having
   a three-phase alternator (1) adapted to be driven at widely varying speeds ($n_E$) from a vehicular-type engine to supply a self-contained network (11, 13) with direct current power having
   a field winding (5);
   a plurality of armature windings (6, 7, 8) corresponding to the phases of the alternator;
   a power rectifier system (12, 14) connected to the respective armature windings and providing direct current output for the self-contained network (11, 13),
   a blower (2) providing forced air circulation (A); and comprising
   an induction motor (4) mechanically connected to the blower (2) to drive the blower with a drive torque which depends on frequency of the alternating current output from the alternator; and
   wherein the motor is a three-phase motor having three motor armature windings, the motor armature windings being subdivided into motor winding portions (16a, 16b; 17a, 17b; 18a, 18b), one of the motor winding portions (16a, 17a, 18a) of the motor armature windings being voltage windings connected in parallel across the armature windings (6, 7, 8) of the alternator, and the other motor armature winding portions (16b, 17b, 18b) of the motor armature winding being current windings, serially connected between the respective armature windings (6, 7, 8) of the alternator and the rectifier system (12, 14).

2. Combination according to claim 1, wherein the induction motor is a three-phase squirrel-cage motor.

3. Combination according to claim 1, wherein the blower is a radial blower or fan.

4. Combination according to claim 1, further including a switch (20) connected between the connection from the at least one alternator phase winding to the induction motor.

5. Combination according to claim 4, wherein said switch is a speed-dependent switch operated in dependence on the speed driving the alternator and closing the connection between the at least one phase of the alternator and the motor when the speed of the alternator drops below a predetermined level.

6. Combination according to claim 4, wherein the switch is a temperature-dependent switch, closing the electrical connection between the at least one phase winding of the alternator and of the motor when a temperature level exceeds a predetermined value.

7. Combination according to claim 4 or 5 or 6, wherein the alternator is a three-phase alternator;
   the motor is a three-phase squirrel-cage induction motor, and the swtich is an at least two-terminal switch interposed between electrical connections from the three armature windings (6, 7, 8) of the alternator to the three phase windings (16, 17, 18) of the motor.

8. Combination according to claim 1, wherein the blower provides forced air circulation in an air stream directed to cool the alternator.

9. Combination according to claim 1, wherein the blower provides an airstream (A) directed to cool a heat exchanger or radiator (R) associated with the engine driving the alternator.

10. Combination according to claim 9, wherein said airstream additionally is directed to cool the alternator.

11. Combination according to claim 1, wherein the motor winding portions of the motor are inductively separated.

12. Combination according to claim 11, wherein the respective motor winding portions of any one winding phase of the motor are positioned in different winding slots of the motor armature.

* * * * *